Sept. 19, 1961 R. FRENKEL 3,000,261
GOLF TRAINER HAVING OPTICAL VIEWING MEANS
Filed Jan. 17, 1957 2 Sheets-Sheet 1
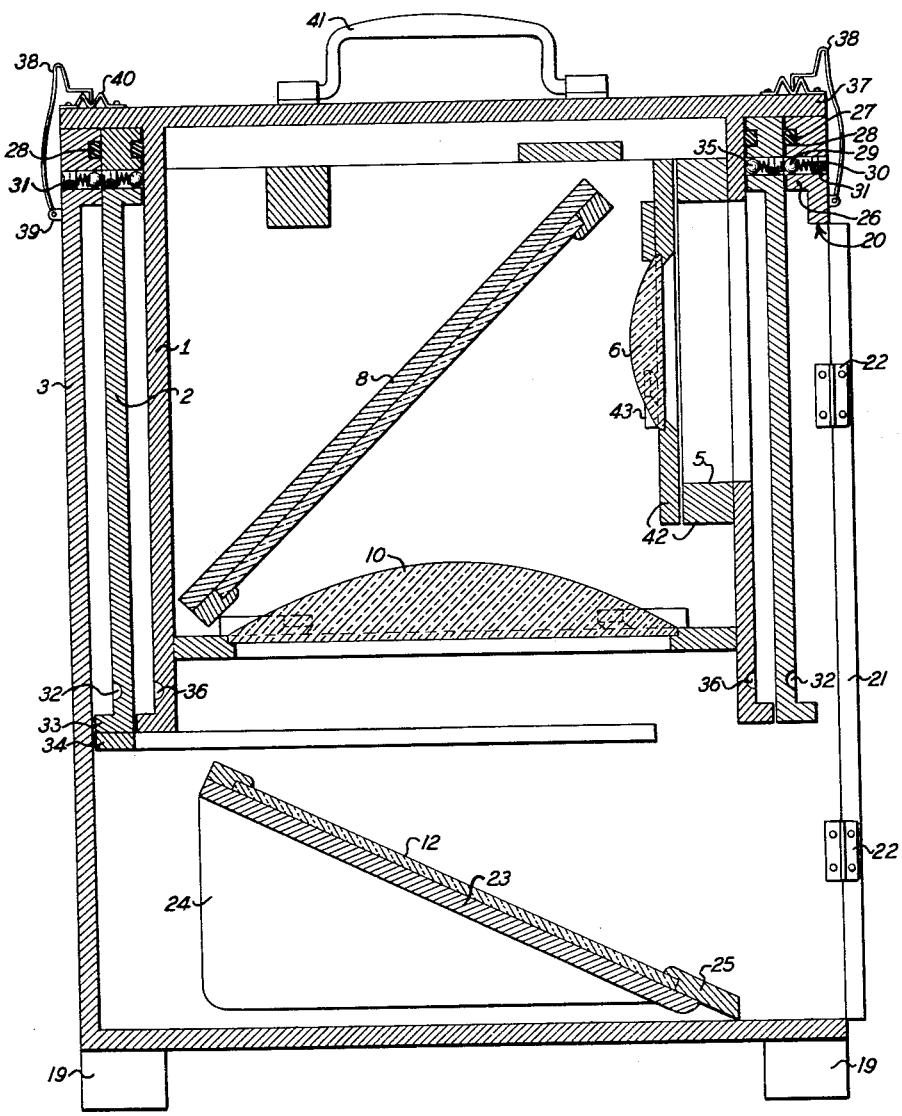
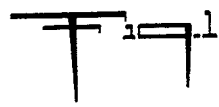

Sept. 19, 1961   R. FRENKEL   3,000,261
GOLF TRAINER HAVING OPTICAL VIEWING MEANS
Filed Jan. 17, 1957   2 Sheets-Sheet 2

United States Patent Office 3,000,261
Patented Sept. 19, 1961

3,000,261
GOLF TRAINER HAVING OPTICAL
VIEWING MEANS
Robert Frenkel, 823 Park Ave., New York, N.Y.
Filed Jan. 17, 1957, Ser. No. 634,679
4 Claims. (Cl. 88—74)

This invention relates to a mirror device particularly suitable for self-training purposes in connection with various games and sports, and more particularly golf.

For improving one's style of performance, in various games, such as golf, it would be desirable for a player in training to be able to observe himself, that is his action, posture and attitude, in the act of going through the motions of the game, such as putting, driving and so on. This however cannot generally be done with an ordinary mirror since the player would have to raise his head to observe himself in the mirror and this position would be in direct violation of the "head down" position essential to a correct golf swing. Hence it will not be possible for him to correct the defects in his play by reference to a professional or expert player whom he is able to observe directly or by practicing himself.

It is the main object of this invention to provide a mirror device which will permit self-observation without requiring any head and/or neck movement liable to disagree with any general body attitude or movement specified as being the correct one for any particular purpose. A related object is the provision of a training aid for golf and eventually other sports where self-observation may be helpful.

Another object is to provide such a mirror device which will permit of a sufficiently wide field of vision to embrace amply both the user in any posture and any accessories or implements he may be using such as a club, bat, racket, or the like.

A further object is to provide such a device which will be readily transportable for indoor or outdoor practicing.

The invention provides an optical device which will reflect the user's image upon a mirror positioned within the field of the user's vision when the user is in any preselected position. With particular reference to golf, the mirror would preferably be positioned relatively close to the lie of the ball.

According to an important object of the invention, the device is preferably housed in an upright casing carrying at its top an "eye" for receiving the player's image, and formed near its base with a window through which the player is able to observe such image. The optical system used may include a pair of angled mirrors for twice deflecting the light beam and thus permit self-observation. Further according to the invention, the optical system may be adapted to reduce the observer's image in a sufficient ratio to permit observation of the complete figure in a mirror of relatively small size if desired. Moreover the entire device is readily foldable into a compact and easily transportable unit.

The above and further objects and features of the invention will be clearly understood from the ensuing disclosure which relates to an exemplary embodiment thereof illustrated in the accompanying drawings wherein:

FIGURE 1 is a vertical sectional view of my improved device in folded condition.

Figure 2:
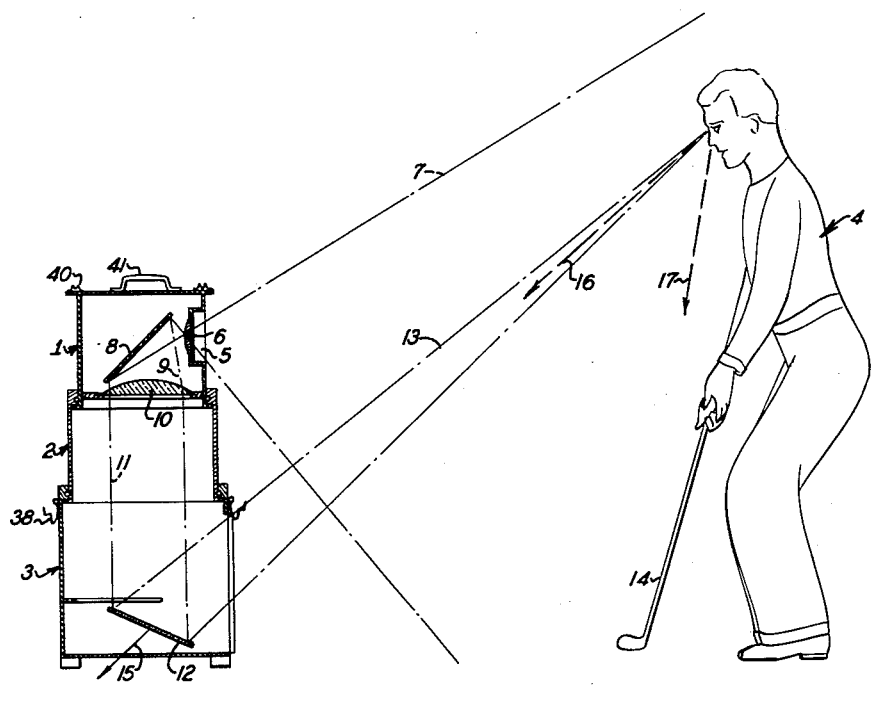
FIGURE 2 is a similar view on a smaller scale showing the device in use, the paths of the beams of light through the device being indicated.

With particular reference to FIG. 2, my improved optical device or training aid is contained within three telescopically interfitted casing sections 1, 2 and 3 to be later described in detail. The top section 1 is formed with an opening 5 in one of its sides at substantially the center of the field to be observed, the user being shown at 4 in FIG. 2. Secured to the section 1 adjacent the window opening 5 and in register with it is a positive lens 6, shown planar-convex in the drawings. The opening 5 and lens 6 together define an angular field of such width that a light beam 7 (representing the image of the user) of generally horizontal center axis completely encompassing the player 4 in any reasonable attitude is transmitted through the lens. This beam is then deflected downwardly by a mirror 8 mounted at a 45° angle. The deflected beam 9 is again passed through a positive lens 10 which converts it to a beam 11 which latter is deflected by a mirror 12 inclined at such an angle as to direct the narrow beam 13 in a generally upward direction into the player's eyes, provided the player is positioned within the angular field defined by the incident beam 7.

It will be readily understood from FIG. 2, that if the mirror 12 is mounted at a lesser inclination than that shown, the outgoing beam 13 may be directed at a more nearly vertical angle than shown, in which case the user may not be able to see himself in full. Conversely the beam 13 may be directed at a flatter inclination, in which case the user by stepping back a few paces will be able to observe a smaller image of himself and the field of vision will be increased, permitting the player to perform wider motions with his arms or club and yet observe himself fully in the device.

It will be noted in this connection that the user observes himself at infinity in the direction 15 since, disregarding the two mirrors 8 and 12, the optical system behaves as an ordinary refracting telescope with the focal points of lenses 6 and 10 virtually in coincidence. In the present case however there is no image reversal as in a telescope, since the reversal is compensated for by the dual reflection through mirrors 8 and 12. In other words, in a conventional telescope, lenses 6 and 10 would invert the image of the user. However, since the mirrors 8 and 12 also invert the image, the image appears to the user in conventional or correct vertical alignment. The resultant view presented to the user by mirror 12 is thus an image as might result from a large mirror placed in front of the user except that the image is reduced in size and is directed upwards to facilitate viewing.

Thus the player will observe in the mirror 12 a substantially reduced image of his complete figure. He is able to encompass the image at a single glance without moving and/or raising his head since it is seen that after having aimed at the assumed lie of the ball, he need simply shift his gaze somewhat from the line of sight 17 to the line of sight 16 without any motion of the neck or head. In effect, the device makes it possible for the player to see himself as he would be seen by another observer whose eye is located at the position occupied by the window 5 and lens 6 comprising the "eye" of the device.

The detailed construction of the device will now be described with reference to FIG. 1.

The lower casing section 3 rests on base blocks 19 and is formed with a side window aperture 20 which aperture enables the player 4 to observe himself in the mirror 12 and may be provided with closure means such as a pair of small shutter flaps 21 pivoted on hinges 22. The mirror 12 is mounted on a backing plate 23 mounted on brackets 24 and secured in place by clamp blocks 25.

The middle casing section 2 is telescopically fitted in the bottom section 3 and is slidable in a thickened guide frame 26 provided at the top of the section 3. A seal 27 is arranged in a groove 28 to prevent the ingress of rainwater into the casing. Lodged in recesses in the frame member 26 are balls 29 pressed by springs 30 the bias of which is adjustable by screws 31. On displacement of the section 2 the balls ride along the outer surface of the latter. As the section 2 reaches the upper end of its travel the balls drop into the sockets 32 and lock the section 2 in its top position. The section 2 is prevented from moving out of the section 3 in an upward direction by a flange 33 at the bottom of the section 2 and adapted to engage the surface of member 26. Similarly in the bottom position the section 2 cannot drop into the section 3 since it then rests upon a shoulder 34 within the latter.

The casing section 1 is mounted in the section 2 in a similar fashion and is locked in its topmost position by spring-pressed balls 35 cooperating with sockets 36. In the lowermost position however the section 1 is adapted to rest upon both the other sections by means of its peripheral flange or lip 37.

Figure 3:
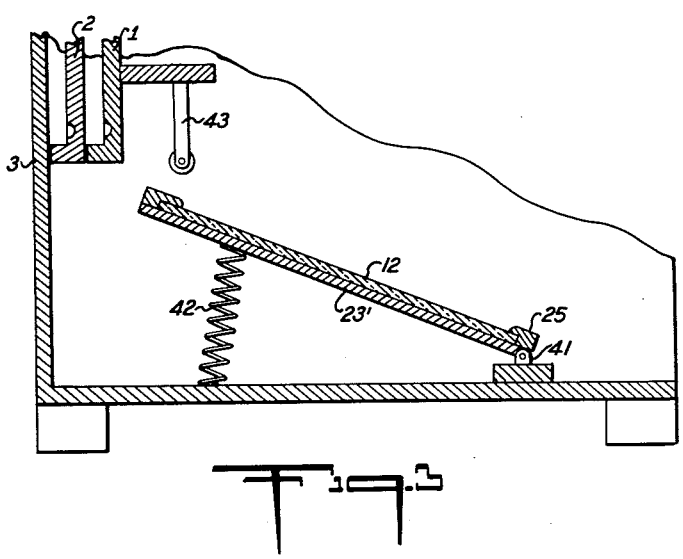
FIGURE 3 is a portion of a modified form thereof.

In the modified form illustrated in FIG. 3, the backing plate 23' for the mirror 12 is hinged at 41 to the bottom of the section 3. A spring 42 urges the mirror 12 upwardly into position of use. A finger 43 fixed at the section 1 is positioned to contact the mirror 12 when the casing sections are telescoped together. It is readily seen that approximately one quarter to one third of the height of section 3 is occupied by the fixed mirror 12 of FIG. 2, whereas in FIG. 3 the mirror is retractable to save that space. In their upward movement urged by spring 42, the mirror 12 and its associated backing plate are arrested at the working position by suitable abutment means such as a limiting stop in hinge 41. In this way, as shown in FIG. 3, the three casing sections can be more fully telescoped without being stopped by a shoulder 34 which can be omitted.

In the retracted condition the assembly is locked by flexible spring latches 38 pivoted at 39 on the section 3 and cooperating with parts 40 formed with central depressions with which the tips of the latches are adapted to engage. The folded unit is then easily lifted and carried about by means of handle or grip 41.

It will be noted that the lens 6 is mounted somewhat spaced from the wall of casing section 1 and rests on a mount 42 to which it is secured by clamping blocks 43. In this way the flange 37 of the upper casing section acts as a sunshield to prevent the rays of the sun from striking the lens and thus prevent glare in the observed image. Further to suppress any glare that may result from stray light rays reflected inside the casing, the inner surfaces of the casing are preferably coated with a suitable dull black paint or other coating.

The mirror 8 and lens 10 are conventionally mounted in the casing 1 and the resulting optical system provides at 12 a reduced, and hence highly luminous, image which will enable the user to distinguish himself clearly and in minute detail. The mirror 12 may desirably be pivotally mounted on a hinge for angular adjustment of the outgoing beam.

While the device is illustrated as being foldable by telescopic means, other folding means might be provided. Thus, the various optical components may be secured on pivoted mounting arms and the complete assembly may be surrounded with a bellows type casing. Further the spring urged balls 29 may be replaced by frictional retaining means.

What I claim is:

1. A golf trainer comprising coaxially aligned and telescopically engaged casing sections, means supporting the sections with the axis thereof in substantially vertical disposition, means on said sections for locking the same in extended relation, means on said sections for locking the same in nesting relation, said sections being constituted at least in part by uppermost and lowermost sections with respect to said extended relation, handle means on said uppermost section for carrying purposes, said uppermost and lowermost sections being provided with vertically aligned openings, a lens having a substantially horizontal focal axis operatively disposed with respect to the opening in the uppermost section, a first mirror operatively disposed with respect to said lens for reflecting images transmitted by the same downwardly along said axis, a second mirror in said lowermost section and operatively disposed to reflect images received from said first mirror outwardly through the opening in the lowermost section and in an upwardly inclined direction, and a further lens between said mirrors, said mirrors and lenses being operatively associated to project an upright image.

2. A trainer as claimed in claim 1 wherein the sections are further constituted by an intermediate imperforate section.

3. A trainer as claimed in claim 1 wherein said lens is recessed from the opening in the uppermost section to minimize the transmission of ambient light.

4. A trainer as claimed in claim 1 comprising shutter means on the lowermost section to cover the opening therein.

References Cited in the file of this patent

UNITED STATES PATENTS

| | | |
|---|---|---|
| 1,327,171 | Ruggles | Jan. 6, 1920 |
| 1,410,811 | Lewis | Mar. 28, 1922 |
| 1,973,665 | Shannon | Sept. 11, 1934 |
| 2,293,271 | Knauf | Aug. 18, 1942 |
| 2,411,704 | Beattie | Nov. 26, 1946 |
| 2,545,675 | Scott | Mar. 20, 1951 |
| 2,808,757 | Scott | Oct. 8, 1957 |

FOREIGN PATENTS

| | | |
|---|---|---|
| 2,484 | Great Britain | 1915 |
| 223,044 | Great Britain | Oct. 16, 1924 |
| 402,499 | Italy | Mar. 11, 1943 |